Patented Aug. 14, 1945

2,381,884

UNITED STATES PATENT OFFICE 2,381,884

SYNTHETIC RESINS AND COATING COMPOSITIONS CONTAINING THEM

Henry S. Rothrock, Wilmington, Del., assignor to E. I. du Pont de Nemours & Company, Wilmington, Del., a corporation of Delaware No Drawing. Application September 19, 1941, Serial No. 411,576

22 Claims. (Cl. 260—22)

This invention relates to synthetic resins and coating compositions containing them, and more particularly to a new type of alkyd resins and coating compositions containing such resins.

Resinous condensation products derived from polyhydric alcohols and polycarboxylic acids, commonly known as "alkyd" resins, have found wide use in coating compositions. Alkyd resins modified with natural drying oils have been particularly useful. The drying oils most frequently used for the preparation of these modified alkyd condensation products include China-wood oil, perilla oil, oiticica oil, soya oil, and linseed oil. Of these, linseed oil and soya oil are lowest in cost and most readily available, but the drying time, hardness and print-resistance of films of alkyd resins modified with these oils need improvement for certain applications. Linseed or soya alkyd resins further modified with China-wood oil are better in these properties, but the use of China-wood oil is limited since it induces a tendency to gelation and to formation of wrinkled films, and since, being largely an imported product, it is subject to wide fluctuation in price, quality, and availability. The desire for oil-modified alkyd resins prepared from readily available low-cost raw materials, which resins will dry rapidly to hard and print-resistant films, is thus apparent.

This invention has as its general objective the preparation of new types of alkyd resins.

Another objective is the preparation, from readily available raw materials, of alkyd resins having outstanding film-forming properties, especially hardness, print-resistance, and fast-drying rates.

A further objective is the partial or total replacement of the drying oil acid radicals in natural drying oil alkyds by other types of acid radicals, more specifically those types which will improve the resin properties associated with the natural drying oil acid radicals.

Another objective is the preparation of improved coating compositions containing these new types of alkyd resins.

The above and other objects are accomplished by preparing resinous condensation products of a polyhydric alcohol, a polycarboxylic acid, and a β-furylacrylic acid.

A preferred method of preparing the types of resins with which this invention is most concerned is to react a natural drying oil with glycerol in the presence of an alcoholysis catalyst to form a partial glyceride (see United States Patents 2,044,747 and 2,123,206), and then to esterify this partial glyceride simultaneously with phthalic anhydride and a β-furylacrylic acid. More specifically, the oil and free polyhydric alcohol, in proportions calculated to give the degree of alcoholysis desired, are placed, along with a small amount of alcoholysis catalyst (e. g., 0.01–1% litharge based on the oil), in a reactor fitted with an agitator, a device to measure the temperature, and a gas inlet. The mixture is then heated with stirring for 1 to 2 hours at about 220–225° C., an oxygen-free inert gas such as carbon dioxide or nitrogen being passed into and over the mixture. Phthalic anhydride and a small proportion of hydrocarbon solvent, such as xylene or toluene, are next introduced and the heating continued. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. After reacting for 1 to 2 hours, the mixture is cooled slightly and the β-furylacrylic acid, in amount sufficient to react with the unesterified alcohol groups present, is added and the heating continued until a product having the desired acid number is obtained. During the above process, additional solvent is added from time to time to maintain the temperature at the desired point. The process described above will be referred to henceforth as the "solution method." It is described in more detail in United States Patent 2,057,765.

Condensation can also be accomplished by carrying out the reaction in a vessel fitted with a stirrer, thermometer, inert gas inlet tube, and an outlet tube to provide for escape of the gas and removal of water of reaction. This latter method, in which a solvent is not employed, will henceforth be referred to as the "fusion method."

In either method, the heating is continued until the desired state of condensation is effected. This point is conveniently determined by acid number and/or viscosity measurements. The selection of the acid number or viscosity to which the final resin should be carried depends on the particular type of resin being made and the use for which it is intended, and is discussed below. When the resin is finished, it is dissolved in a suitable solvent and then clarified, if necessary, by centrifuging or filter pressing, after which it is ready for formulation into coating compositions in the usual ways.

The preferred β-furylacrylic acid for use in the invention, and the one with which the invention is principally illustrated hereinafter, is β-(2-furyl)-acrylic acid. This acid can be made by any of the methods described in the literature, or it can be prepared by reaction of furfural, methyl acetate, and sodium methoxide, to form methyl β-(2-furyl)acrylate, which is converted to β-(2-furyl)acrylic acid by saponification and acidification. Methods for preparing other β-furylacrylic acids appear hereinafter.

The more detailed practice of the invention is illustrated in the examples, wherein the amounts of the ingredients are by weight, such examples being given by way of illustration and not as a limitation. In these examples, viscosities are at 25° C. and are in poises. Colors are one the Gardner-Holdt scale. Acid numbers are based on the solids. The drier proportions refer to the per cent of metal, usually added as the soluble naphthenate soap, based on the combined natural drying oil and β-furylacrylic glyceride content of the resin. The term "mineral spirits" refers to an aliphatic hydrocarbon fraction boiling at 150–200° C., and the term "Hi-Flash naphtha" refers to an aromatic hydrocarbon solvent boiling at 160–200° C. The "Ester Formulas" at the beginning of each example are an index to the proportions of the various esters theoretically present in the product. To illustrate, a product referred to as having 49% linseed oil, 3% β-(2-furyl)-acrylic glyceride, and 48% phthalic glyceride is a product prepared from proportions of reactants so chosen as to yield a mixture of the three mentioned constituents in the stated proportions by weight if it be assumed no mixed esters are formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are undoubtedly present.

Examples 2, 3, 4, 11, and 14 show the use of a single fatty oil (linseed) in varying amounts and with varying proportions of the β-furylacrylic acid. Examples 1, 5, 7, 8, and 9 illustrate the use of other fatty oils. Examples 5, 6, and 12 are typical resins made with polyvalent components other than glycerol and phthalic anhydride. Example 10 is a resin modified only with β-(2-furyl)acrylic acid, and Example 13 is a resin made with a different β-furylacrylic acid. Example 5 illustrates a complex resin made with several oils and several polycarboxylic acids. As a group, the examples also show the more significant variations in procedure, e. g., fusion method, solution method, prior alcoholysis of fatty oil and of a mixed ester of a β-furylacrylic acid, and other different ways of reacting the ingredients.

EXAMPLE 1

*Ester formula*

|  | Per cent |
|---|---|
| Soya oil | 55 |
| β-(2-furyl)acrylic glyceride | 10 |
| Phthalic glyceride | 35 |

A solution method reactor is charged with 550 parts of alkali-refined soya oil, 116 parts of dynamite glycerol and 0.1 part of litharge ground to a slurry in 1 part of soya oil. The mixture is heated with vigorous stirring under a blanket of carbon dioxide at 225° C. for 1 hour, at which point a 25% solution of the treated oil in methanol is completely clear. To the hot oil is added cautiously 271 parts of phthalic anhydride and 43 parts of xylene. This mixture is heated during 1 hour to 230° C., is held at 230° C. for 0.5 hour, and is then allowed to cool slightly. β-(2-furyl)acrylic acid, 91.5 parts, and 21 parts of dynamite glycerol are then added, and heating is continued for 7 hours at 230° C., water of reaction being removed and sufficient additional reflux solvent added from time to time to maintain the temperature at the desired point. At this point, the resin has an acid number of 8, and heating is stopped and the hot resin thinned with mineral spirits to 60% solids, there being obtained a clear solution showing an acid number of 7.1 (on solids), a viscosity of 3.4, and a color of 4.6. With 0.03% cobalt, the unpigmented solution dries tack-free in 1 to 2 days to films much harder and more mar-resistant than those of a soya oil modified glycerol-phthalic resin of comparable oil length. With pigments, high gloss enamels can be prepared. Durability exposures covering a period of 15 months in Delaware have given excellent results, the resin being generally superior to an unmodified linseed oil alkyd used for comparison.

EXAMPLE 2

*Ester formula*

|  | Per cent |
|---|---|
| Linseed oil | 35 |
| β-(2-furyl)acrylic glyceride | 5 |
| Phthalic glyceride | 60 |

A quantity of linseed oil monoglyceride is made by heating 4410 parts of alkali-refined linseed oil, 854 parts of dynamite glycerol, and 6.7 parts of a 20% sodium hydroxide solution at 230° C. under a blanket of carbon dioxide until the product is soluble to the extent of 30% in methanol. This process requires about 1 hour. In a separate reactor fitted for solution method operation, 1168 parts of the linseed oil monoglyceride, 396 parts of dynamite glycerol, 1300 parts of phthalic anhydride, 128 parts of β-(2-furyl)acrylic acid, and 150 parts of xylene are heated for 6 hours at 200° C. as the water of reaction is removed. The resin thus obtained has an acid number of 45. A 48.6% solution in equal parts of xylene and amyl acetate has a specific gravity of 1.001, a viscosity of 1.2 poises, and a color of 4.2. With the addition of driers, the product is ready for use as a fast- and hard-drying clear coating composition. The resin is also particularly well adapted to the formulation of fast-baking, high gloss, durable enamels.

In order to determine the effect of the β-(2-furyl)acrylic acid as a substitute for linseed oil acids and phthalic acid, the above resin was compared with two types of controls; viz., a 35% linseed oil alkyd resin and a 40% linseed oil alkyd resin, each being prepared so as to match as closely as possible the properties of the resin described above. To the above resins was added sufficient cobalt drier to yield 0.1% cobalt, the product thinned suitably with Hi-flash naphtha, and films flowed on auto body steel. The dried films, each approximately 1 mil thick, were tested for printing by placing on them, over cheesecloth, a 1 pound per square inch weight. Such tests after 1 and 7 days' drying revealed that the β-(2-furyl)acrylic acid modified resin showed practically no printing, being in this respect much superior to the two control resins, which had printed very badly. The results of these tests, which are shown in the following table, indicate the β-(2-furyl)acrylic acid, when substituted in part either for linseed oil acids or for phthalic acid in short oil alkyd resins, markedly improves the hardness and print resistance.

|  | Ester formulae | | |
|---|---|---|---|
|  | Linseed oil, 35%; phthalic glyceride, 65%; (control) | Linseed oil, 40%; phthalic glyceride, 60%; (control) | Linseed oil, 35%; $\beta$-(2-furyl) acrylic glyceride, 5% phthalic glyceride, 60%; (resin of Ex. 2) |
| Dust-free | 20 minutes | 65 minutes | 20 minutes. |
| Tack-free | 1 hour | 3.5 hours | 2 hours. |
| Hardness (overnight) | Intermediate | Poor | Excellent. |
| Printing (1 day) | Very bad | Bad | Almost none. |
| Printing (1 week) | Bad | do | None. |

EXAMPLE 3

*Ester formula*

|  | Per cent |
|---|---|
| Linseed oil | 56 |
| $\beta$-(2-furyl) acrylic glyceride | 14 |
| Phthalic glyceride | 29 |
| Excess glycerol | 1 |

A fusion method reaction vessel is charged with 1567 parts of alkali-refined linseed oil, 329 parts of dynamite glycerol, and 3.9 parts of a 20% sodium hydroxide solution. The mixture is blanketed with carbon dioxide and heated with vigorous stirring to 225° C., then held at this point until a 30% solution in methanol is clear, this process requiring about 0.5 hour. To the hot monoglyceride thus obtained are added 628 parts of phthalic anhydride, 260 parts of $\beta$-(2-furyl)-acrylic acid, and 47 parts of dynamite glycerol. The resulting mixture is heated under a slowly increasing carbon dioxide blow for 1 hour at 200° C., 3 hours at 225° C., and 7 hours at 250° C. The resulting resinous product has an acid number of 6. A 50% solution in mineral spirits has a specific gravity of 0.911, a viscosity of 6.1, and a color of 5.9. This resin is well adapted for formulation into fast-drying, hard paints, varnishes, and enamels for both indoor and outdoor use. As an example of such use, the resin is pigmented by grinding a solution containing 8 parts resin in a ball mill for five days with 11 parts of a 3:1 mixture of barytes and titanium oxide. The resulting product is mixed with sufficient drier solution to give 1.1% lead and 0.14% cobalt based on oil. The paint thus obtained is found to have excellent brushing qualities, yielding fast-drying, glossy, hard, durable finishes over wood or metal.

EXAMPLE 4

*Ester formula*

|  | Per cent |
|---|---|
| Linseed oil | 70 |
| $\beta$-(2-furyl) acrylic glyceride | 10 |
| Phthalic glyceride | 20 |

In a fusion method vessel is placed 7350 parts of alkali-refined linseed oil, 990 parts of dynamite glycerol, and 18.5 parts of 20% sodium hydroxide solution. The mixture is heated with good stirring until a sample is miscible with an equal amount of methanol, the process requiring about 1 hour at 220° C. A solution method vessel is now charged with 2220 parts of the above linseed glyceride, 256 parts of $\beta$-(2-furyl) acrylic acid, 421 parts of phthalic anhydride, and sufficient mineral spirits to cause refluxing to take place at 225° C. This mixture is heated at 225° C. for 12.5 hours, after which a resinous product of acid number 5.4 is obtained. A 91.2% solution in mineral spirits has a specific gravity of 1.028, a viscosity of 7.5, and a color of 6.5. This resin is well adapted for formulation into paints, varnishes and enamels for both indoor and outdoor use. Such coatings dry fairly rapidly to films which are tough and hard.

The following table shows the better drying properties of the resins of Examples 3 and 4 in relation to a 70% linseed oil modified glycerolphthalic alkyd, films being laid down in all instances from mineral spirits solutions containing 0.05% cobalt. From these tests, it will be seen that $\beta$-(2-furyl) acrylic acid, when substituted in part for either the linseed oil acids or the phthalic acid in long oil alkyd resins, imparts superior drying ability to the resin.

|  | Ester formulae | | |
|---|---|---|---|
|  | Linseed oil, 56%; $\beta$-(2-furyl) acrylic glyceride, 14%; phthalic glyceride, 29%; excess glycerol, 1%; (resin of Ex. 3) | Linseed oil, 70%; $\beta$-(2-furyl) acrylic glyceride, 10%; phthalic glyceride, 20%; (resin of Ex. 4) | Linseed oil, 70%; phthalic glyceride, 30%; (control) |
| Dust-free | 1.5 hours | 3 hours | 1.5 hours. |
| Tack-free | 10 hours | 9 hours | 24 hours. |
| Hardness (overnight) | Excellent | Good | Poor. |
| Mar-resistance | do | do | Very poor. |

EXAMPLE 5

*Ester formula*

|  | Per cent |
|---|---|
| Soya oil | 42 |
| Linseed oil | 20 |
| $\beta$-(2-furyl) acrylic glyceride | 5 |
| Maleic glyceride | 2 |
| Phthalic glyceride | 29 |
| Excess glycerol | 2 |

A solution method alkyd resin kettle is charged with 1050 parts of alkali-refined soya oil, 500 parts of alkali-refined linseed oil, 336 parts of dynamite glycerol, 7.6 parts of 20% sodium hydroxide solution, and 100 parts of mineral spirits. The mixture is heated with good stirring at 225° C. until the glycerol is dissolved, the process requiring about 0.5 hour. After the solution has cooled slightly, 560 parts of phthalic anhydride, 114 parts of β-(2-furyl)acrylic acid, and 35 parts of maleic anhydride are added, and heating is continued for 6 hours at 225° C. A resinous product of acid number 6.3 is obtained. An 84% solution in mineral spirits has a specific gravity of 1.014, a viscosity of 29, and a color of 4.5. With addition of driers, this resin solution is ready for use as a coating composition. Films dry rapidly, have good hardness and wrinkle-resistance, and exhibit excellent mar-resistance. These films, in comparison to those laid down under comparable conditions from a 42% soya oil-20% linseed oil-2% maleic glyceride-36% phthalic glyceride resin, are much superior in hardness, mar-resistance, and freedom from tack.

EXAMPLE 6

*Ester formula*

| | Per cent |
|---|---|
| Linseed oil | 80 |
| β-(2-furyl)acrylic glyceride | 10.4 |
| Maleic glyceride | 9.6 |

A solution method alkyd resin kettle is charged with 1200 parts of alkali-refined linseed oil, 96.5 parts of dynamite glycerol, and 142 parts of β-(2-furyl)acrylic acid. Sufficient xylene is added to cause refluxing at 225° C., and the mixture is heated with stirring at 225° C. until an acid number of 9.3 is obtained, the process requiring about 1.5 hours. After the resulting mixture has cooled slightly, 101 parts of maleic anhydride is added, the temperature then being brought back to 225° C., where it is held for 4.75 hours. A resinous product of acid number 9.4 is obtained. A 94.8% solution in xylene has a specific gravity of 0.933, a viscosity of 17.6, and a color of 5.4. This solution is suitable for use in coating compositions. With 0.05% cobalt, films become dust-free in 2 hours and tack-free in 8 hours. In comparison, films of an 80% linseed oil modified glycerol-maleic alkyd, laid down under comparable conditions, require 4 and 12 hours to dry to the dust-free and tack-free stages, respectively, and they are also softer and less mar-resistant. Substitution of β-(2-furyl)acrylic acid for maleic acid is thus seen to improve an alkyd resin greatly with respect to important film properties.

When the above proportions of ingredients are combined by first alcoholyzing the linseed oil with the glycerol, using litharge as a catalyst, according to the method of Example 1, then adding simultaneously the β-(2-furyl)acrylic acid and maleic anhydride, and completing the esterification in the presence of xylene and 0.1% of a 1:1 mixture of monosodium phosphate and aluminum sulphate, the resin had generally similar properties, but showed superior color (3.9) and dried to lighter-colored films.

EXAMPLE 7

*Ester formula*

| | Per cent |
|---|---|
| Soya oil | 42 |
| β-(2-furyl)acrylic glyceride | 5 |
| Phthalic glyceride | 50 |
| Excess glycerol | 3 |

A fusion method alkyd resin kettle is charged with 2940 parts of alkali-refined soya oil, 569 parts of dynamite glycerol, and 7.5 parts of 20% aqueous sodium hydroxide solution. The mixture is heated with vigorous stirring at 235° C. until it is soluble to the extent of 25% in methanol, the process requiring about 1 hour. A solution method vessel is now charged with 1400 parts of the thus obtained soya oil monoglyceride, 348 parts of dynamite glycerol, 1018 parts of phthalic anhydride (6% deficiency), 128 parts of β-(2-furyl)acrylic acid, and 100 parts of Hi-flash naphtha. The mixture is heated at 220° C for 10 hours, a resinous product of acid number 4.5 being obtained. A 50% solution in a 2:1 mixture of Hi-flash naphtha and mineral spirits has a specific gravity of 0.960, viscosity of 12.9, and color of 4.8. With .1% cobalt drier, this resin solution is ready for use as a clear coating composition. It dries rapidly to tack-free films of excellent hardness, such films being much harder than those of 47% and 42% soya oil modified glycerol-phthalic alkyds. The resin is likewise suitable for use as a vehicle for fast-baking, glassy, hard enamels. For example, 200 parts of the resin solution just mentioned can be ground for 5 days in a ball mill with 18 parts of titanium oxide and 12 parts of bone black, 0.2% manganese then being added, and a gray baking enamel is obtained. Over bare steel, this enamel dries in one hour at about 110° C. to a glossy, mar-resistant, adherent coating. After several months' exposure in Florida, these films retain their flexibility and adhesion, show no blistering or checking, and have better gloss and chalking qualities than a mixed linseed-China-wood oil modified alkyd of approximately 50% oil length.

If the excess glycerol is omitted in the preparation of the resin of Example 7, the resulting product has a higher acid number and dries slightly slower, but has better overnight hardness and mar-resistance.

EXAMPLE 8

*Ester formula*

| | Per cent |
|---|---|
| Dehydrated castor oil | 50 |
| β-(2-furyl)acrylic glyceride | 5 |
| Phthalic glyceride | 41 |
| Excess glycerol | 4 |

A fusion method reaction vessel is charged with 4410 parts of dehydrated castor oil, 854 parts of dynamite glycerol, and 6.7 parts of 20% sodium hydroxide solution. The mixture is heated with good stirring until a 30% solution in methanol is clear, the process requiring about 1.5 hours at 235° C. A solution method reaction vessel is now charged with 1672 parts of the so obtained dehydrated castor oil monoglyceride, 888 parts of phthalic anhydride, 248 parts of dynamite glycerol, 128 parts of β-(2-furyl)acrylic acid, and 100 parts of Hi-flash naphtha. The mixture is heated at 225° C. for 6 hours, whereby a resinous product of acid number 6.4 is obtained. A 50.7% solution of this resin in a 2:1 mixture of Hi-flash naphtha and mineral spirits has a specific gravity of 0.952, viscosity of 17.6, and color of 3.8. With 0.1% cobalt, this resin solution dries rapidly to films of excellent gloss, hardness, and durability. These films are much superior in hardness, mar-resistance, and freedom from tack to those laid down in a comparable manner from a control resin having the ester formula 50% dehydrated castor oil, 46% phthalic glyceride, and 4% excess glycerol.

EXAMPLE 9

*Ester formula*

| | Per cent |
|---|---|
| Coconut oil | 51.5 |
| β-(2-furyl)acrylic glyceride | 3.2 |
| Phthalic glyceride | 45.3 |

In a fusion method reaction vessel are placed 321 parts of refined coconut oil, 116.9 parts of glycerol, and 0.17 part of sodium hydroxide dissolved in 1.7 parts of water. This mixture is heated at 220° C. for 1.25 hours, a slow stream of carbon dioxide being passed into and over the liquid. The apparatus is then equipped for solution method operation; the partial glyceride is cooled to about 160° C.; and 219 parts of phthalic anhydride, 15 parts of toluene, and 17.4 parts of β-(2-furyl)acrylic acid are added. After refluxing for 6 hours at 210–220° C., with separation of the water of reaction, a very viscous solution of a resin having an acid number of 2.2 is obtained. Dilution to 70% solids with toluene gives a solution of viscosity 2.0 and color 3.9. A valuable nitrocellulose lacquer can be obtained by mixing 6.5 parts of this resin solution with 9.0 parts of a 26% solution of nitrocellulose, and thinning to spraying viscosity with lacquer diluents (2.0 parts ethyl acetate, 5.2 parts butanol, 3.5 parts butyl acetate, and 10.0 parts toluene). Films show good flexibility, gloss, adhesion, and resistance to embrittlement.

EXAMPLE 10

Ester formula

|  | Per cent |
| --- | --- |
| β-(2-furyl)acrylic glyceride | 44 |
| Phthalic glyceride | 56 |

Glycerol, 60 parts, 90 parts of β-(2-furyl)acrylic acid, and 10 parts of Hi-flash naphtha are heated under carbon dioxide at 190° C. for 1.5 hours in a solution method apparatus, during which period 9.5 parts of water are removed. After the partial ester has been cooled to about 100° C., 97 parts of phthalic anhydride is added and the temperature raised slowly to 200–210° C., where it is maintained for 2.5 hours. During this period, about 15 parts of water of esterification are removed; the product becomes very viscous; and the final resinous mixed ester has an acid number of 50. A 50% solution in the monoethyl ether of ethylene glycol has a viscosity of 1.4. With 0.03% drier and at room temperature, films become tack-free in 3 to 4 hours and very hard overnight.

EXAMPLE 11

Ester formula

|  | Per cent |
| --- | --- |
| Linseed oil | 45.00 |
| β-(2-furyl)acrylic glyceride | 3.00 |
| Phthalic glyceride | 49.75 |
| Excess glycerol | 2.25 |

A mixture of 1230 parts of alkali-refined linseed oil and 528 parts of dynamite glycerol is placed in a solution method reactor and heated to 100° C. with efficient stirring under a blanket of inert gas. At this point 0.6 part of litharge is added and the temperature brought to 225° C., where it is held until a 25% solution in methanol is clear. To the hot monoglyceride thus obtained is added 83 parts of methyl β-(2-furyl)acrylate; a very slow stream of inert gas is bubbled through the melt; and the mixture is meanwhile heated at 225° C. for one hour. During this process, 14 parts of methanol distills off. At the end of this heating period, 1049 parts of phthalic anhydride and 130 parts of Hi-flash naphtha are added and the heating continued at 225° C. until the viscosity of a 50% solution of the resin in a 2:1 mixture of Hi-flash naphtha and mineral spirits becomes 17 poises, this process requiring about 4 hours. The final resin is thinned with 1710 parts of Hi-flash naphtha and 920 parts of mineral spirits, a solution being thus obtained which has a viscosity of 25, a solids content of 50%, acid number of 13.2 (on the solids), color 4.5, and specific gravity of 0.956. This resin solution can be used to formulate fast-drying, glossy, hard enamels. Thus, sufficient of this solution to contain 100 parts resin is ground for 5 days in a ball mill with 67 parts of light cadmium red pigment, 0.24% cobalt and 0.32% manganese driers then being added. After a proper reduction of viscosity with Hi-flash naphtha, this enamel is ready for use. Over bare steel, films become tack-free in five hours, and after an overnight dry are hard, glossy, and mar- and print-resistant. When exposed outdoors, the films show excellent gloss retention, flexibility, adhesion, mar-resistance, and durability.

The resin of Example 11 can also be formed into a valuable black enamel by grinding a solution of 100 parts of the resin with 7 parts of carbon black, and thereafter adding 0.31% cobalt, 0.28% manganese, and 2.12% lead. Over Bonderized or primed steel, films of this enamel become tack-free in 4.5 hours, and, like the above red enamel, show excellent gloss retention, flexibility, adhesion, mar-resistance, and durability.

EXAMPLE 12

Ester formula

|  | Per cent |
| --- | --- |
| Linseed oil | 58 |
| β-(2-furyl)acrylic ester of pentaerythritol | 12 |
| Adipic acid ester of pentaerythritol | 30 |

A solution method reactor is charged with 145 parts of linseed oil, 35.4 parts of pentaerythritol, and 0.1 part of litharge ground to a slurry in 0.5 part of linseed oil. The mixture is heated with vigorous stirring under a blanket of carbon dioxide at 230–240° C. for 2.5 hours. To this oil, cooled to 150° C., are added 61.5 parts of adipic acid, 27.5 parts of β-(2-furyl)acrylic acid, and 15 parts of toluene. This mixture is heated at 200–220° C. for 2 hours, water of reaction being removed and sufficient additional reflux solvent being added from time to time to maintain the temperature at the desired point. Heating is now stopped and the hot resin thinned with a mixture of mineral spirits and naphtha to 75% solids, there being obtained a clear solution showing an acid number of 39 (based on solids), a viscosity of 7.5, and a color of 3.9. With 0.03% cobalt, the unpigmented solution dries to films which, after 12 hours, have excellent hardness, wrinkle-resistance, and mar-resistance. These films, in comparison with those laid down under comparable conditions from a resin having the ester formula 58% linseed oil and 42% adipic ester of pentaerythritol, are appreciably superior in freedom from tack, mar-resistance, and hardness after 12 hours' drying.

EXAMPLE 13

Ester formula

|  | Per cent |
| --- | --- |
| Linseed oil | 44 |
| β-[2-(5-methylfuryl)]acrylic glyceride | 10 |
| Phthalic glyceride | 44 |
| Excess glycerol | 2 |

A solution method reactor is charged with 30 parts of a mixed glyceride of ester formula 21.9% β-[2-(5-methylfuryl)]acrylic glyceride and 78.1% linseed oil (prepared according to the method of Rothrock Serial No. 372,392, filed December 30, 1940), 3 parts of linseed oil, 10.4 parts of dynamite grade glycerol, and 0.1 part of litharge ground into 1 part of linseed oil. The mixture is heated with vigorous stirring under a blanket of carbon dioxide at 200° C. for 2 hours. To this alcoholized oil, cooled to 150° C., are added 22.2 parts of phthalic anhydride (a 12% deficiency) and 5 parts of toluene. This mixture is heated at 200-214° C. for 1 hour and 20 minutes, water of reaction being removed and sufficient additional reflux solvent added from time to time to maintain the temperature at the desired point. Heating is now stopped and the hot resin thinned with a mixture of mineral spirits and naphtha to 55% solids, there being obtained a clear solution showing an acid number of 15.7 (based on solids), a viscosity of 15.2, and a color of 7.5. With 0.03% cobalt, the unpigmented solution dries tack-free in 6 hours. After drying overnight, the films are outstanding in mar-resistance, wrinkle-resistance, and hardness, being closely analogous in these respects to a similar resin of ester formula 42% linseed oil, 10% β-(2-furyl)acrylic glyceride, and 48% phthalic glyceride. The dried films of the resin described in this example are considerably harder and possess markedly better mar-resistance than films, flowed under comparable conditions, of a resin of ester formula 52% linseed oil and 48% phthalic glyceride.

EXAMPLE 14

*Ester formula*

| | Per cent |
|---|---|
| Linseed oil | 44 |
| β-(2-furyl)acrylic glyceride | 10 |
| Phthalic glyceride | 44 |
| Excess glycerol | 2 |

A solution method reactor is charged with 881 parts of the linseed oil monoglyceride described in Example 2, 159 parts of dynamite glycerol, 146 parts of β-(2-furyl)acrylic acid, 523 parts of phthalic anhydride, and 144 parts of Hi-flash naphtha. A slow stream of inert gas is bubbled through the mixture, which is brought to 220° C. during 2 hours, and heating is continued at 220° C. for 6 hours, at which point, a 50% solution of the resin in a 2:1 mixture of Hi-flash naphtha and mineral spirits has a viscosity of 17. The hot resin is thinned with the above solvent mixture to yield a 50% solution, which has a viscosity of 24, acid number of 6.7 (on solids), specific gravity of 0.960, and color of 5.7. In the presence of 0.1% cobalt drier, the resin dries dust-free in 45 minutes and tack-free in 4.5 hours. The films are hard and non-thermoplastic.

The great efficacy of β-furylacrylic acids in improving the film properties of alkyd resins appears to be highly specific and associated with the particular sequence of double bonds which are partly in the side chain and partly in the heterocyclic ring. The remarkable changes in resin properties are perhaps attributable in part to the multiple conjugation, but clear evidence has been obtained that this particular structure, as such, plays a minor role in comparison to some unknown phenomenon arising from the unsaturation going through the furane ring. Thus, sorbic acid, which, like β-(2-furyl)acrylic, has two double bonds conjugated with each other and with carboxyl, produces in alkyds effects which are in no sense like those resulting from a comparable modification of the resin with β-furylacrylic acids. The following table contains specific comparative data. The "Pencil hardness" is the general type of test referred to by Gardner ("Physical and Chemical Examination of Paints, Varnishes, Lacquers, and Colors," 8th ed., p. 285) in which the hardness is shown in terms of the softest pencil which will scratch the film. The particular pencils used were Dixon's Eldorado pencils, in which the scale, beginning with the hardest, is 9H, 8H, 7H, 6H, 5H, 4H, 3H, 2H, H, F, HB, B, 2B, 3B, 4B, 5B, and 6B. The print-resistance was determined by laying cheesecloth on a film 1.2 mils in thickness placing a 1-pound weight of standard cross-section over the cheesecloth and allowing it to remain for 3 hours at 50° C., removing the weight and the cloth, and observing the print marks on the film if any.

| Ester formula of resin | Percent | Printing | Pencil hardness |
|---|---|---|---|
| β-(2-furyl) acrylic glyceride | 10 | None | 3H |
| Linseed oil | 44 | | |
| Phthalic glyceride | 44 | | |
| Excess glycerol | 2 | | |
| Sorbic glyceride | 10 | Severe | F |
| Linseed oil | 44 | | |
| Phthalic glyceride | 44 | | |
| Excess glycerol | 2 | | |
| Linseed oil | 54 | Severe | B+ |
| Phthalic glyceride | 44 | | |
| Excess glycerol | 2 | | |

While this invention, in its broadest sense, relates to resins derived from a polyhydric alcohol, a polycarboxylic acid, and a β-furylacrylic acid, with or without further modifying agents, care must be exercised in choosing the ingredients so that the final product has properties which are necessary and desirable in view of the intended use. For example, in preparing resins to be used in coating compositions, it is necessary to choose the ingredients and to operate the process in a way that will give products which are soluble, especially in convenient solvents. Those skilled in the art are familiar with the principles involved, the major one of which is that the tendency to solubility increases with the amount of monofunctional modifier; e. g., the β-furylacrylic acid or other monocarboxylic acid. If a gelled product is desired for use in moldings, floor coverings, or like compositions, the same principle applies; i. e., a lesser amount of monofunctional modifiers is indicated.

While the products made without modifiers other than the β-furylacrylic acid are new and useful, and form a part of the invention, the most valuable resins are those which are further modified with fatty oils, particularly drying and semi-drying oils such as linseed and soya oils. These products are particularly useful as vehicles for coating compositions.

In preparing these resins, any polyhydric alcohol, any resinifiable polycarboxylic acid, any β-furylacrylic acid, and any other known type of alkyd resin modifying agent (including any fatty oil or oil acid) can be used. Upon saponification with alkali, the resins revert to the polyhydric alcohol, the alkali-salt of the polycarboxylic acid, and the alkali-salt or other reaction product of the β-furylacrylic acid.

Among the various polyhydric alcohols that can be used, there may be mentioned ethylene glycol, propylene glycol, butylene glycol, etc.; mixtures of glycols; polyglycols, such as diethylene glycol, triethylene glycol, etc.; glycerol, polyglycerols; sorbitol; pentaerythritol; mannitol; cyclohexyl-1,2-dicarbinol; methyltrimethylolmethane; p,p'-di(2-hydroxyethyl)-benzene; and various mixtures of these polyhydric alcohols.

Among the polycarboxylic acids which can be used for the preparation of these condensation products, there may be mentioned, by way of example, succinic, adipic, sebacic, maleic, fumaric, itaconic, acetylene dicarboxylic, malic, tartaric, citric, camphoric, phthalic, isophthalic, terephthalic, diphenic, and phenylglutaric acids. The anhydride can be used instead of the acid, and in many instances this is preferable.

Other modifying agents which can be used include: fatty oils; e. g., linseed, soya, China-wood, cottonseed, oiticica, perilla, castor, coconut, sunflower seed, and corn oils; monocarboxylic acids; e. g., butyric, stearic, acrylic, oleic, glycolic, lactic, chloroacetic, benzoic, salicylic, and rosin acids, also the acids derived from any of the fatty oils just mentioned; monohydric alcohols; e. g., butyl n-dodecyl, allyl, benzyl, and cyclohexyl alcohols; and the various synthetic oils which are described in applications, Serial Numbers 372,391, 372,392, 372,393, and 372,394, filed December 30, 1940, these oils being polyhydric alcohol mixed esters of certain 2,4-diunsaturated monocarboxylic acids and different monofunctional monocarboxylic acids.

The expression "a β-furylacrylic acid" is used in a generic sense to include, not only the specific compound β-(2-furyl)acrylic acid, but also those acids (wherein the furane ring is attached, preferably at the 2-position, to the beta carbon of the acrylic acid radical) having a substituent on the alpha carbon, or another substituent on the beta carbon, or one or more substituents in the furane ring, or any combination of these. The presence or absence of such substituents does not change the particular sequence of the double bonds, involving the furane ring, which is considered to be the critical element of structure associated with the exceptionally good properties of the resins.

Any β-furylacrylic acid, as the term has been defined herein, or any esterifiable derivative thereof; e. g., an acid halide or an ester with a volatile alcohol, can be used. In addition to those of the examples, other suitable acids or derivatives thereof, and one suitable source for each are as follows:

| β-Furylacrylic acid [1] | Obtainable by reaction of — |
| --- | --- |
| α-methyl-β-(2-furyl)acrylic | Furfural and methylproprionate. |
| α-cyano-β-(2-furyl)acrylic | Furfural and cyanoacetic acid. |
| α,β-di-(2-furyl)acrylic | Furfural and methyl ester of 2-furylacetic acid. |
| α-phenyl-β-(2-furyl)acrylic | Furfural and methyl ester of phenylacetic acid. |
| α,β-dimethyl-β-(2-furyl)acrylic | Methyl furyl ketone with methyl α-bromopropionate, followed by dehydration. |
| β-cyclohexyl-β-(2-furyl)acrylic | Cyclohexyl furyl ketone with methyl α-bromoacetate, followed by dehydration. |
| β-(3-furyl)acrylic | 3-aldehydofurane with acetic anhydride and sodium acetate. |
| β-[2-(5-methylfuryl)]acrylic | Acetic anhydride and sodium acetate with 5-methylfurfural. |
| β-[2-(5-chlorofuryl)]acrylic | Acetic anhydride and sodium acetate with 5-chlorofurfural. |

[1] It is apparent from most of the synthetic methods given that esters of the acid with lower aliphatic monohydric alcohols are often obtained first. These esters can be used as such or they can be first saponified in known manner.

The optimum proportion of fatty oil to be used with the resins of this invention is not necessarily governed by the practice in the alkyd resin art of employing relatively large amounts of oil to obtain softer and more durable resins for use in paints, and of employing small amounts of oil to obtain harder, faster-drying resins for use in varnishes and enamels. Only when the β-furylacrylic glyceride content is less than about 5% do these principles apply in selecting the best oil length. If the resin is to contain appreciably more than 5% β-furylacrylic glyceride, a considerably larger amount than usual of the fatty oil will ordinarily be used to obtain films having the best properties.

In preparing the resins of this invention, the proportions used are usually stoichiometrical, but they can be varied to some extent if desired. In some instances, an excess of glycerol in the order of 1% to 4% will improve the drying rate somewhat. The method of reaction can be any of the methods known to the art, but, as already noted, it should be chosen with due consideration of the type of resin being prepared and the use for which it is intended. The solution method of United States Patent 2,057,765 and the older fusion technique are shown in the examples and are in general suitable. When the latter method is used, the reactor should preferably have only one small vent in order to obtain better control and a lighter colored product. The order of reacting the ingredients can be varied more or less depending on their nature. Fatty oils should be heated with all or a part of the polyhydric alcohol before addition of the acid components. When only acid and alcohol components are employed, the common procedure is to heat them all together, but usable products are obtained with practically any order of reaction. Whether or not oils are present, some of the polycarboxylic acid can be withheld; occasionally with advantage, even until the apparently completed resin has been thinned with a solvent; however, the addition of the β-furylacrylic acid should be completed before the heating stage is ended. The β-furylacrylic acid radicals can be obtained from the polyhydric alcohol esters of β-furylacrylic acids or from their mixed esters with different monocarboxylic acids; e. g., drying oil acids, in which case such esters may be alcoholized in the usual way with glycerol before the polycarboxylic acid is introduced. In summary, as might be expected by those experienced in the alkyd resin art, there are a variety of operable techniques for forming the resins of this invention. Thus the order of incorporating the different ingredients of the resin, the method of incorporating the fatty oil, (i. e., whether by direct reaction, by ester interchange, or by use of free fatty acids), and the esterification conditions may be varied widely. It is even possible to form the alkyds of this invention entirely by interchange reactions, for example between methyl β-(2-furyl) acrylate, methyl phthalate, and linseed oil.

Any temperature at which the reaction proceeds in a convenient length of time is operable in the present invention. For preparing alkyd resins starting with β-furylacrylic acids, the preferred range in the absence of catalyst is 200–250° C., lower temperatures causing too slow a reaction, and higher temperatures tending to give colored products. In the presence of catalyst, temperatures as low as 100° C. are operable. Suitable catalysts include acids such as sulfuric, para-toluenesulfonic, phosphoric, and hypophosphorous acids. In some instances, for example, at high temperatures and in open kettle equipment, it is desirable to add agents designed to improve the color of the product. Such agents include the phosphites, such as triphenyl phosphite, and certain acidic salts, such as monosodium phosphate. When derivatives of β-furylacrylic acids are employed, special conditions are required. Thus, when esters of these acids with volatile alcohols are used, it is necessary to select conditions favoring ester interchange. As catalysts for this reaction, litharge and sodium hydroxide have been found effective. Temperatures of 150–250° C. will generally be best. A useful method consists in carrying out the ester interchange with the polyhydric alcohol, followed by reaction with acidic ingredients of the resin. Where fatty oils are to be introduced into the resin, they also may be incorporated by interchange before, during, or just following the interchange of the β-furylacrylic ester.

The soluble products of this invention are useful as vehicles for improved air-drying or baking coating compositions. These coatings can be made up as desired and in known manner with pigments, metallic driers, dyes, fillers, waxes, inhibitors, plasticizers, thinners and all such common auxiliary components. Such coatings can also contain, as needed and desired, other film-forming materials, such as, for example, cellulose nitrate, cellulose acetate, ethyl cellulose, and other cellulose derivatives; chlorinated rubber, isomerized rubbers, and other rubber derivatives; urea-formaldehyde resins; phenol-formaldehyde resins; other alkyd resins; gums such as rosin, ester gum, and limed rosin; soluble types of nylons; and resins such as polymethyl methacrylate, polystyrene and polyvinyl acetate. Any of these compositions can be used, directly or over suitable base coats, on metal, wood, glass, leather, stone, cloth, paper, rubber, and in general any surface which is to be protected from atmospheric or other influences. These resins can also be used in adhesive and molding compositions, with or without the other polymeric materials above.

It is apparent that many widely different embodiments of this invention may be made without departing from the spirit and scope thereof; and, therefore, it is not intended to be limited except as indicated in the appended claims.

I claim:

1. A β-furylacrylic acid-modified alkyd resin.
2. A β-furylacrylic acid-fatty oil-modified alkyd resin.
3. A β-(2-furyl)acrylic acid-modified alkyd resin.
4. A β-(2-furyl)acrylic acid-fatty oil-modified alkyd resin.
5. A β-(2-furyl)acrylic acid-natural drying oil-modified alkyd resin.
6. A β-(2-furyl)acrylic acid-linseed oil-modified alkyd resin.
7. A β-(2-furyl)acrylic acid-soya oil-modified alkyd resin.
8. A condensation product of a polyhydric alcohol, a polycarboxylic acid, and a β-furylacrylic acid.
9. A condensation product of a polyhydric alcohol, a polycarboxylic acid, a β-furylacrylic acid, and a fatty oil acid.
10. A condensation product of a polyhydric alcohol, a polycarboxylic acid, and β-(2-furyl)-acrylic acid.
11. A condensation product of a polyhydric alcohol, a polycarboxylic acid, β-(2-furyl)acrylic acid, and a fatty oil acid.
12. A condensation product of a polyhydric alcohol, a polycarboxylic acid, β-(2-furyl)acrylic acid, and a drying oil acid.
13. A condensation product of a polyhydric alcohol, a polycarboxylic acid, β-(2-furyl)acrylic acid, and linseed oil acids.
14. A condensation product of glycerol, phthalic anhydride, β-(2-furyl)acrylic acid, and a fatty oil acid.
15. A condensation product of glycerol, maleic anhydride, β-(2-furyl)acrylic acid, and a fatty oil acid.
16. A condensation product of glycerol, phthalic anhydride, an ester of β-(2-furyl)acrylic acid, and a fatty oil acid.
17. A resinous product which is saponifiable with an alkali to yield a polyhydric alcohol, an alkali salt of a polycarboxylic acid, and a reaction product of a β-furylacrylic acid.
18. A resinous product which is saponifiable with an alkali to yield a polyhydric alcohol, an alkali salt of a polycarboxylic acid, a reaction product of a β-furylacrylic acid, and an alkali salt of a fatty oil acid.
19. A coating composition containing a β-furylacrylic acid-modified alkyd resin.
20. A coating composition containing a β-furylacrylic acid-fatty oil-modified alkyd resin.
21. An enamel containing a β-furylacrylic acid-modified alkyd resin.
22. An enamel containing a β-furylacrylic acid-fatty oil-modified alkyd resin.

HENRY S. ROTHROCK.

---

CERTIFICATE OF CORRECTION.

Patent No. 2,381,884.                                August 14, 1945.

HENRY S. ROTHROCK.

It is hereby certified that error appears in the printed specification of the above numbered patent requiring correction as follows: Page 2, first column, line 16, for the words "are one" read --are on--; page 6, first column, line 6, for "200° C." read --220° C.--; and that the said Letters Patent should be read with this correction therein that the same may conform to the record of the case in the Patent Office.

Signed and sealed this 18th day of December, A. D. 1945.

Leslie Frazer
First Assistant Commissioner of Patents.

(Seal)

phosphites, such as triphenyl phosphite, and certain acidic salts, such as monosodium phosphate. When derivatives of β-furylacrylic acids are employed, special conditions are required. Thus, when esters of these acids with volatile alcohols are used, it is necessary to select conditions favoring ester interchange. As catalysts for this reaction, litharge and sodium hydroxide have been found effective. Temperatures of 150–250° C. will generally be best. A useful method consists in carrying out the ester interchange with the polyhydric alcohol, followed by reaction with acidic ingredients of the resin. Where fatty oils are to be introduced into the resin, they also may be incorporated by interchange before, during, or just following the interchange of the β-furylacrylic ester.

The soluble products of this invention are useful as vehicles for improved air-drying or baking coating compositions. These coatings can be made up as desired and in known manner with pigments, metallic driers, dyes, fillers, waxes, inhibitors, plasticizers, thinners and all such common auxiliary components. Such coatings can also contain, as needed and desired, other film-forming materials, such as, for example, cellulose nitrate, cellulose acetate, ethyl cellulose, and other cellulose derivatives; chlorinated rubber, isomerized rubbers, and other rubber derivatives; urea-formaldehyde resins; phenol-formaldehyde resins; other alkyd resins; gums such as rosin, ester gum, and limed rosin; soluble types of nylons; and resins such as polymethyl methacrylate, polystyrene and polyvinyl acetate. Any of these compositions can be used, directly or over suitable base coats, on metal, wood, glass, leather, stone, cloth, paper, rubber, and in general any surface which is to be protected from atmospheric or other influences. These resins can also be used in adhesive and molding compositions, with or without the other polymeric materials above.

It is apparent that many widely different embodiments of this invention may be made without departing from the spirit and scope thereof; and, therefore, it is not intended to be limited except as indicated in the appended claims.

I claim:

1. A β-furylacrylic acid-modified alkyd resin.
2. A β-furylacrylic acid-fatty oil-modified alkyd resin.
3. A β-(2-furyl)acrylic acid-modified alkyd resin.
4. A β-(2-furyl)acrylic acid-fatty oil-modified alkyd resin.
5. A β-(2-furyl)acrylic acid-natural drying oil-modified alkyd resin.
6. A β-(2-furyl)acrylic acid-linseed oil-modified alkyd resin.
7. A β-(2-furyl)acrylic acid-soya oil-modified alkyd resin.
8. A condensation product of a polyhydric alcohol, a polycarboxylic acid, and a β-furylacrylic acid.
9. A condensation product of a polyhydric alcohol, a polycarboxylic acid, a β-furylacrylic acid, and a fatty oil acid.
10. A condensation product of a polyhydric alcohol, a polycarboxylic acid, and β-(2-furyl)-acrylic acid.
11. A condensation product of a polyhydric alcohol, a polycarboxylic acid, β-(2-furyl)acrylic acid, and a fatty oil acid.
12. A condensation product of a polyhydric alcohol, a polycarboxylic acid, β-(2-furyl)acrylic acid, and a drying oil acid.
13. A condensation product of a polyhydric alcohol, a polycarboxylic acid, β-(2-furyl)acrylic acid, and linseed oil acids.
14. A condensation product of glycerol, phthalic anhydride, β-(2-furyl)acrylic acid, and a fatty oil acid.
15. A condensation product of glycerol, maleic anhydride, β-(2-furyl)acrylic acid, and a fatty oil acid.
16. A condensation product of glycerol, phthalic anhydride, an ester of β-(2-furyl)acrylic acid, and a fatty oil acid.
17. A resinous product which is saponifiable with an alkali to yield a polyhydric alcohol, an alkali salt of a polycarboxylic acid, and a reaction product of a β-furylacrylic acid.
18. A resinous product which is saponifiable with an alkali to yield a polyhydric alcohol, an alkali salt of a polycarboxylic acid, a reaction product of a β-furylacrylic acid, and an alkali salt of a fatty oil acid.
19. A coating composition containing a β-furylacrylic acid-modified alkyd resin.
20. A coating composition containing a β-furylacrylic acid-fatty oil-modified alkyd resin.
21. An enamel containing a β-furylacrylic acid-modified alkyd resin.
22. An enamel containing a β-furylacrylic acid-fatty oil-modified alkyd resin.

HENRY S. ROTHROCK.

CERTIFICATE OF CORRECTION.

Patent No. 2,381,884. August 14, 1945.

HENRY S. ROTHROCK.

It is hereby certified that error appears in the printed specification of the above numbered patent requiring correction as follows: Page 2, first column, line 16, for the words "are one" read --are on--; page 6, first column, line 6, for "200° C." read --220° C.--; and that the said Letters Patent should be read with this correction therein that the same may conform to the record of the case in the Patent Office.

Signed and sealed this 18th day of December, A. D. 1945.

Leslie Frazer
First Assistant Commissioner of Patents.

(Seal)